(12) United States Patent
Castez

(10) Patent No.: US 7,377,501 B2
(45) Date of Patent: May 27, 2008

(54) AEROSTATIC SUSPENSION SYSTEM FOR ROLLING EQUIPMENT AND VEHICLES

(75) Inventor: Daniel Hugo Castez, Calle 36, No. 571, Dept. B, La Plata (AR) B1902AYW

(73) Assignee: Daniel Hugo Castez, Buenos Aires (AR)

( * ) Notice: Subject to any disclaimer, the term of this patent is extended or adjusted under 35 U.S.C. 154(b) by 229 days.

(21) Appl. No.: 10/533,972

(22) PCT Filed: Nov. 7, 2003

(86) PCT No.: PCT/ES03/00569

§ 371 (c)(1),
(2), (4) Date: May 5, 2005

(87) PCT Pub. No.: WO2004/041562

PCT Pub. Date: May 21, 2004

(65) Prior Publication Data

US 2006/0022392 A1    Feb. 2, 2006

(30) Foreign Application Priority Data

Nov. 8, 2002    (AR) .............................. P020104284

(51) Int. Cl.
*F16F 9/04* (2006.01)
*B60G 11/27* (2006.01)

(52) U.S. Cl. ................ 267/64.19; 267/256; 267/64.16; 267/64.15; 280/124.11

(58) Field of Classification Search ............. 267/64.11, 267/64.15, 64.16, 64.19, 64.27, 241, 242, 267/243, 140.2, 256, 24, 31; 280/124.109, 280/124.125, 124.128, 124.129, 124.153, 280/124.158, 124.1, 124.11, 124.111, 124.112, 280/124.114, 124.157
See application file for complete search history.

(56) References Cited

U.S. PATENT DOCUMENTS

| 1,547,243 | A | * | 7/1925 | Wadsworth ................. 267/241 |
| 3,278,197 | A | * | 10/1966 | Gerin ................. 280/124.128 |
| 3,767,181 | A | | 10/1973 | Schrier et al. |
| 6,988,718 | B1 | * | 1/2006 | Eulenbach et al. ........... 267/33 |

FOREIGN PATENT DOCUMENTS

| DE | 3734724 A | 7/1988 |
| DE | 10105300 A1 | 8/2002 |
| ES | 2166609T | 4/2000 |
| GB | 177942 A | 4/1922 |

OTHER PUBLICATIONS

International Search Report.

* cited by examiner

*Primary Examiner*—Thomas J Williams
(74) *Attorney, Agent, or Firm*—The H.T. Than Law Group

(57) ABSTRACT

An aerostatic suspension system (1) for rolling equipment and vehicles that takes advantage of atmospheric pressure to create, via cylinder and piston sets, forces that are transmitted by levers having an adjustable point of application of force and that at their distal ends are articulated with wheel support rods. The forces, acting individually on each wheel, aerostatically suspend the weight plus its load of the equipment or vehicle.

11 Claims, 10 Drawing Sheets

AEROSTATIC SUSPENSION SYSTEM FOR ROLLING EQUIPMENT AND VEHICLES

This invention relates to a suspension system basically comprising a set of elements which enable the atmospheric pressure to support the weight of an equipment or that of a vehicle in a state of neutral flotation, acting individually on each wheel.

STATE OF THE ART AND PROBLEMS TO BE SOLVED

Energy savings in load and passenger transportation means is the main objective of this new design. In standard means of transportation, the suspension system is based on the use of coil springs, leaf-springs or a combination of them, whose oscillation is inhibited by means of dampers; the structures of said means are designed to be able to stand the forces generated by compression of said leaf-springs and/or coil springs, which can exceed the weight of said means. This makes it necessary to construct heavy structures that are able to stand the enormous forces originated by sudden changes in elevation of the wheels of said means of transportation as a function of road profile.

The main points where energy is lost, as a direct and indirect consequence of the need to dampen the movement transmitted by the tyres to the structure of the vehicle as it runs, are hereinafter enumerated:

a) Firstly, the load/weight ratio of the vehicle in standard transportation systems is very low. It must be remembered that a modern sedan car, for instance, weighs approximately 1000 kg and is often used to transport only one passenger with an average weight of 80 kg. One of the main reasons for this excessive weight of the vehicle is the need to make it resistant to the enormous forces transmitted by the wheels during normal use. In vehicles with damper suspension, fuel consumption is a direct function of their total weight.

b) In standard vehicles, the tyres, even when they are correctly inflated, are responsible for energy losses due to rolling resistance, which represent between twenty and forty percent of the power generated by the engine. This energy is converted into heat in an irreversible process.

c) The suspension system itself, converts the energy related to vertical movement of the wheels, as they encounter slopes, depressions and potholes present on the road, into heat in the support mounting rubber bushes of the wheels and within the dampers themselves where a liquid is forced through a small hole. Thus, the damper acts as a transducer of mechanical energy into heat, also in an irreversible way.

The system hereby described avoids all these energy losses by making the suspension mechanism of the weight of chassis+engine+load independent from the driving mechanism (e.g.: electric motors mounted on rear wheels). The wheels of the vehicle, due to their design, can move vertically copying the profile of the road, without energy losses (except the energy needed to overcome the inertia of wheel-axle+supporting rod +lever+cylinder set—as described in the present invention—which represent a small percentage of the total mass of the vehicle) while the vehicle is suspended in an equilibrium position by the atmospheric pressure. This is the reason why it is impossible for changes in road profile to be converted into destructive forces acting on the vehicle, its load or its kinetic energy. This characteristic is the fundamental reason responsible for all the energy savings related to the implementation of said system.

A few advantages of the system described in the present specification are hereinbelow enumerated:
1. This system allows construction of lighter vehicles, thus improving the load/weight ratio thereof.
2. Said system allows use of solid-rubber, tubeless tyres.
3. Last but not least, the implementation of said system will entail a reduction in damage to roads, streets and highways as a consequence of the fact that the force exerted by each wheel on the road has a constant value which is independent from the vehicle speed and which is the same as that exerted when the vehicle is at rest (this force, for a four-wheeled vehicle is essentially one fourth of the weight of the vehicle).

In vehicles with standard suspension systems, this force is also present (under the form of the vehicle weight divided by 4) but this must be compounded with the fact that it is necessary to raise the vehicle weight and compress the suspension coil spring, which represents an enormous amount of energy that produces huge pressures that must be absorbed by the road. These pressures are proportional to the square of the speed of the vehicle, that is, when speed is doubled, pressure show a four-fold increase.

The system design according to the invention makes use of elements that the state-of-the-art technology can easily produce at low cost. The essential elements of said suspension system are, for each wheel, a cylinder with a polished inner surface and a piston provided with elastomeric primary and secondary seals of synthetic rubber. The other parts of the system are of common use in the industry.

SUMMARY OF THE OF INVENTION

The present invention refers to a suspension system that comprises basically a set of elements that enable the atmospheric pressure to support the weight of equipment or vehicle in a state of neutral flotation, acting independently on each wheel. The atmospheric pressure acts on a cylinder and piston set such that said pressure opposes the separation of their inner faces with a force which magnitude on each face is a function of the piston section area. The force generated on the static element is absorbed by the structure. The opposite force generated on the moving element, in this case the cylinder, is transmitted by means of a lever system with an adjustable point of application of transmitted force and which articulates at the opposite end with a telescopically-mounted wheel supporting rod. The adjustment of the point of application allows for adjustment of suspension capacity of the system as a function of variations in the load to be transported. Once the point of application has been adjusted, the load of the equipment or vehicle will be aerostatically suspended. In this condition, the equipment or vehicle can be raised or lowered just by overcoming its inertia, since its weight has been taken care of by the atmospheric pressure. By the same token, it is possible to keep the equipment or vehicle at a constant elevation with respect to a reference level while the wheels go up and down copying the profile of the road. The supporting forces are a function of cylinder section area (expressed in $cm^2$) and ambient atmospheric pressure (roughly 1 $kg/cm^2$)

DETAILED DESCRIPTION OF THE INVENTION

The aerostatic suspension system according to the invention that will hereinafter be described, works independently for each wheel, being identical the principles and mode of operation, thus it will be described just for one of the wheels.

Figure 1:
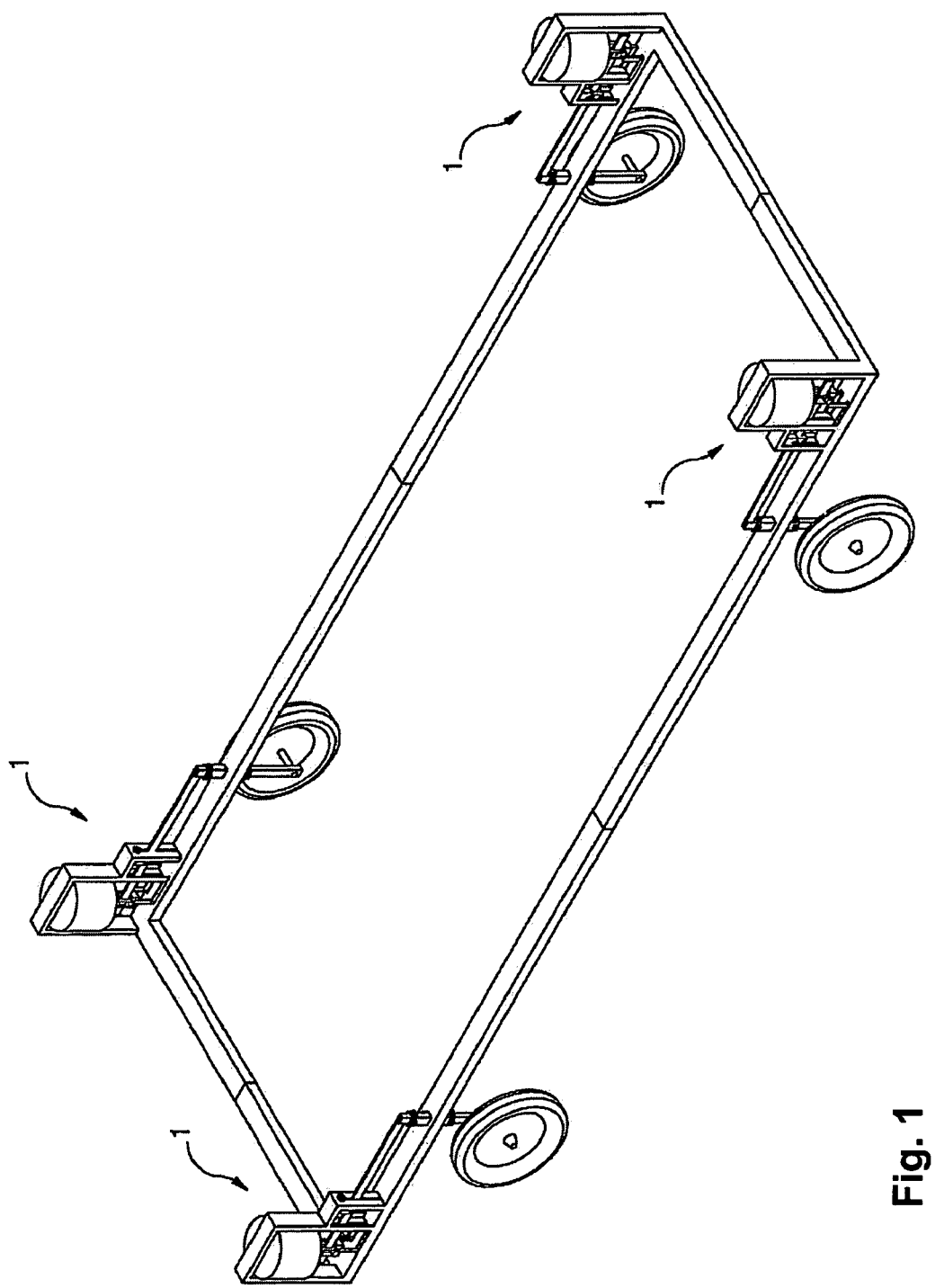
FIG. 1 shows an isometric view of the aerostatic suspension system according to the invention on a four-wheeled chassis.

In FIG. 1, a particular embodiment is shown of a chassis on four wheels, each one provided with an aerostatic suspension system 1 according to the invention.

Figure 2:
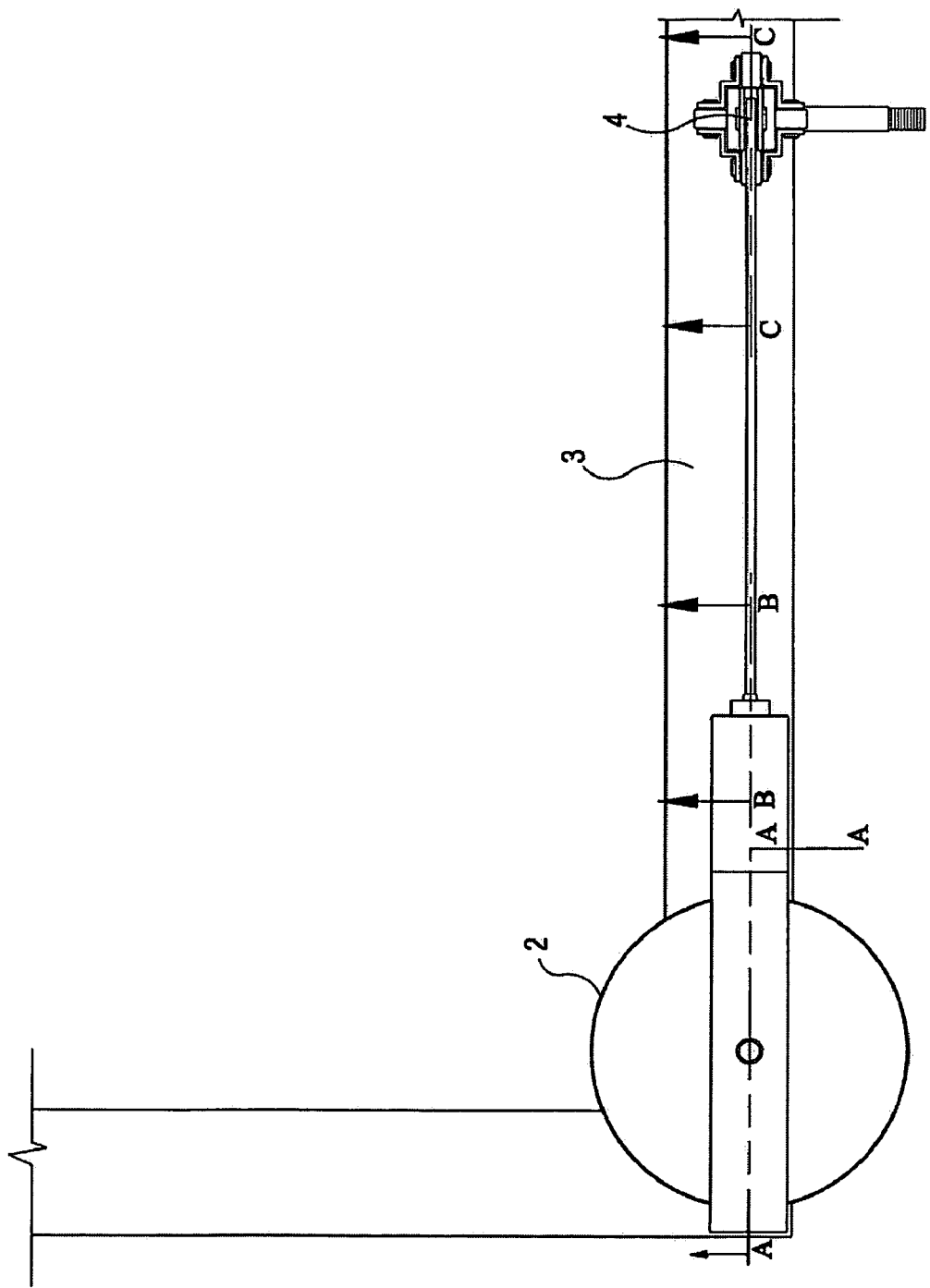
FIG. 2 is a plan view of the system mounting for one of the wheels, with indications of sections on A-A, B-B and C-C.
Figure 3:
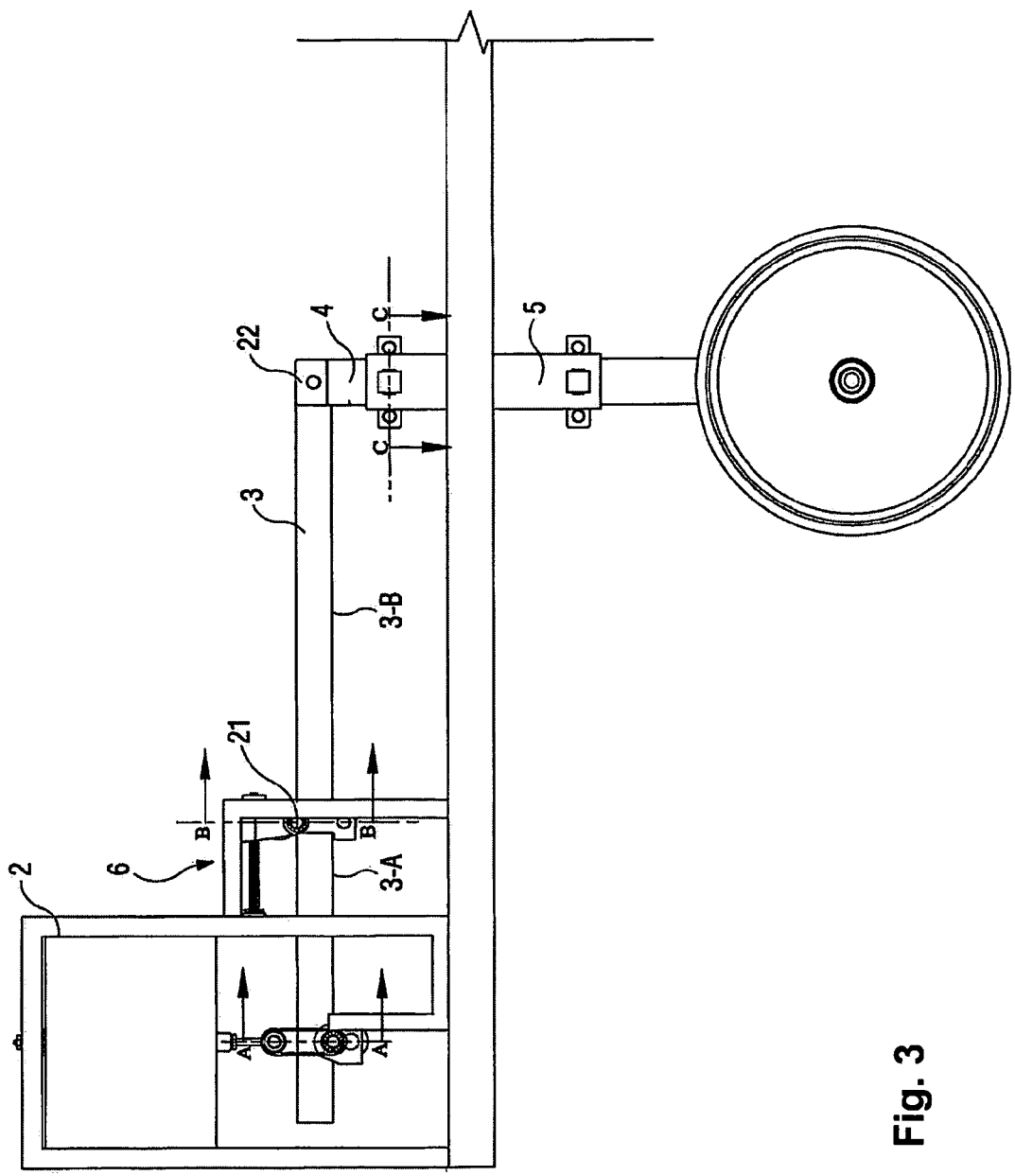
FIG. 3 is an elevation view of the system mounting of the same wheel, with indications of sections on A-A, B-B, y C-C.

FIG. 2 is a plan view of the system embodied on one of the wheels. This picture shows the position of cylinder-piston set 2, lever 3 and wheel-support rod 4 that can also be seen on the elevation view in FIG. 3. FIG. 3 also shows the telescopic mounting 5 of the wheel support rod. Additionally, FIG. 3 shows the adjustable point of application mechanism 6.

Figure 4:
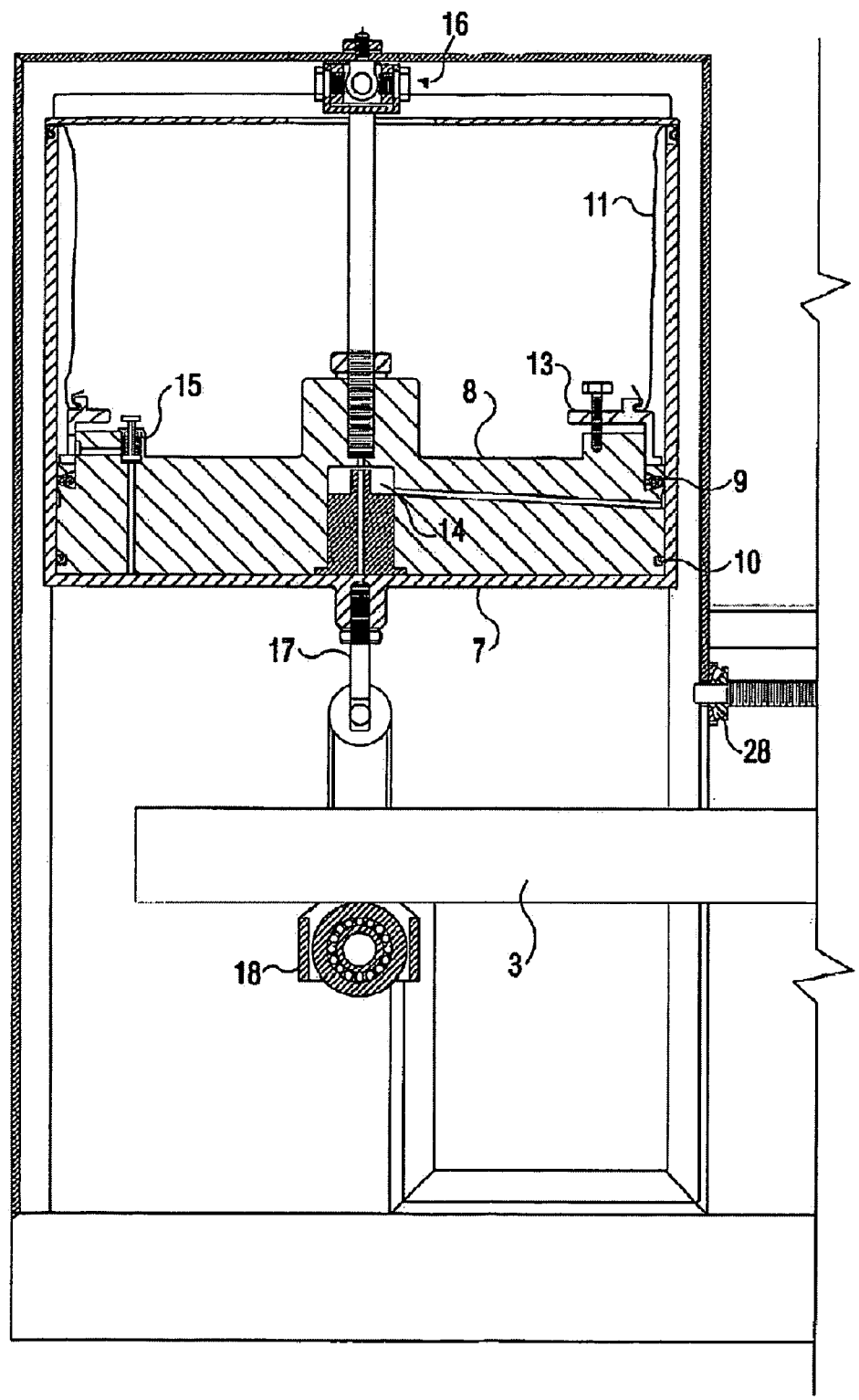
FIG. 4 shows section on A-A, as indicated in FIG. 2.
Figure 10:
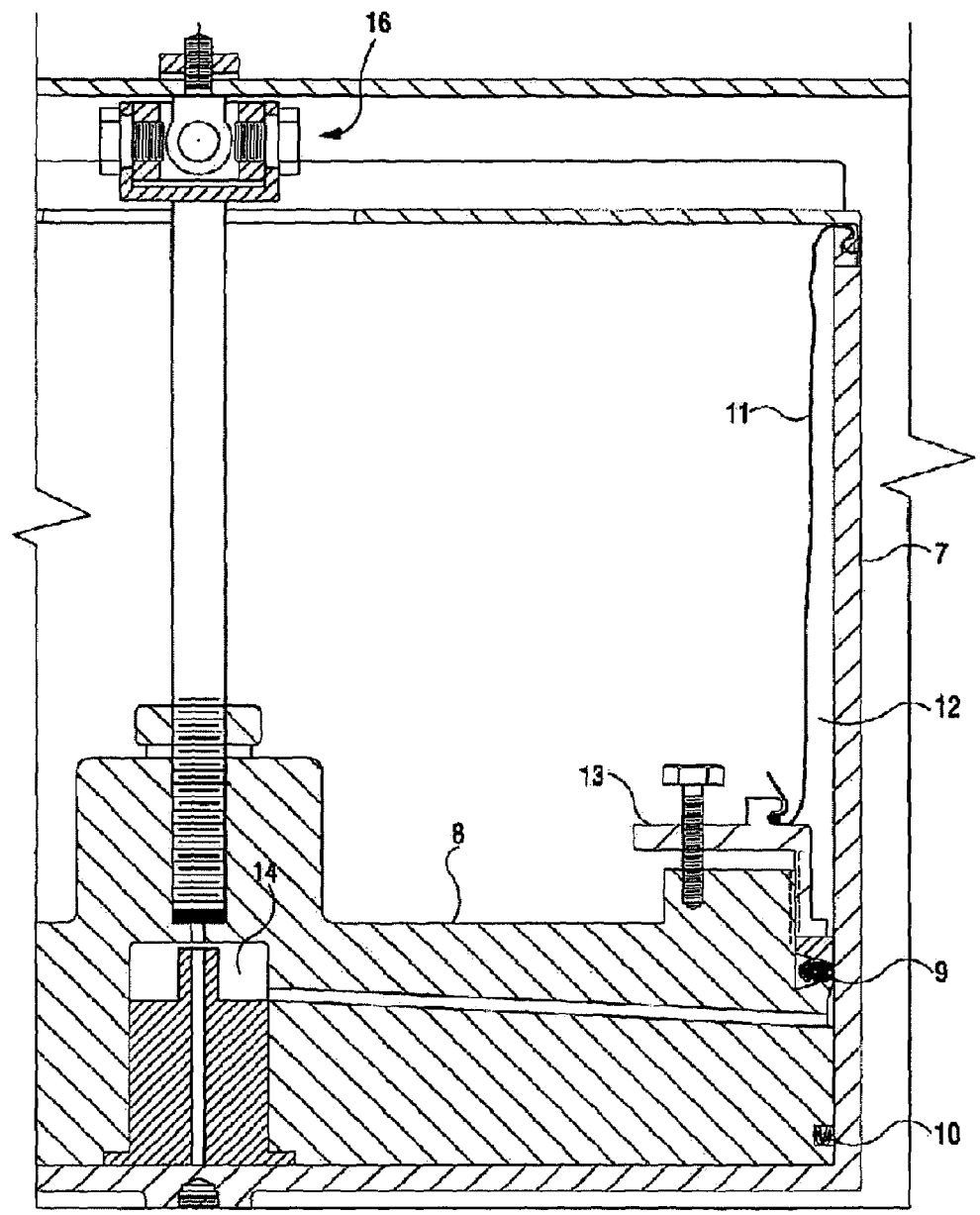
FIG. 10 shows an enlarged view of FIG. 4, with construction details of cylinder and piston that are too small to be seen in FIG. 4.

FIG. 4, which is the section on A-A of FIG. 2, as well as FIG. 10, which is an enlarged view of FIG. 4, show the principal elements of the system: a cylinder 7, that can move freely along the path set by piston 8 mounted inside said cylinder; said piston provided with two elastomeric seals 9 and 10, and a synthetic rubber sleeve 11 which is fixed to the external side of said piston at one end and to the opposite end of the cylinder at the other end of said sleeve. A chamber 12 between said cylinder and sleeve is thus created in which there is a certain amount of lubricant. This lubricant must have as its main characteristic, besides having high lubrication power, low vapour pressure at ambient temperature. This lubrication should also include in its formulation solid lubrication compounds based on $MbS_2$ and graphite. The clearance between said cylinder and piston should be the minimum value that can be mechanically achieved, taking into account that they work at the same temperature (ambient temperature). Both elements must be made of the same materials as they must have the same expansion coefficient. The elastomeric seal 9 is an o'ring with about 10 mm circular section for a cylinder with a diameter around 200 mm. Said o'ring is mounted on a duck-tail groove in which one of the side walls comprises a sliding ring that can be displaced by threaded ring 13, which is provided in turn with a setting screw that fixes the position of said threaded ring once the correct compression of o'ring has been attained. The surface finish for these elements should be 0.25-0.50μ The purpose of threaded ring 13 is to lightly compress o'ring so as to create a contact area between said o'ring and the cylinder. The contact band between cylinder and o'ring, which surface finish must be 0.25-0.50μ, must have a width of approximately 0.1-0.2 mm corresponding to a compression that must not exceed 0.127 mm (according to product specifications as provided by the supplier for dynamic elastomeric seals). Such embodiment is enough to prevent lubricant oil—and thus also air—from entering the cylinder. Secondary seal 10 is a U-seal that works as an oil-scraper so as to keep the lubricant in this area, ensuring lubrication of the cylinder wall in the vacuum area, and maintaining the lubricant level in chamber 14 in FIG. 4, so as to ensure minimal friction motion of primary seal 9 shown in the same FIG. FIG. 10 shows the design of lubricant-chamber 14. As it can be seen by examining the figures, as the cylinder moves relative to the piston, sleeve 11 filled with lubricant completely ensures the tightness of the system. As time goes by, small amounts of lubricant may transpose the seal barrier and it will become necessary to purge it by exerting a counter-pressure through adequate means and manually or electronically opening valve 15 shown in FIG. 4. The lubricant thus purged returns to lubricant-chamber 12. This operation must be carried out when vehicle is at rest, with a frequency which will depend on the design characteristics of the particular embodiment and on the number of hours of use. The critical aspect for the correct working of the system is the adjustment of the compression of o'ring 9. Said seal rides on the inner surface of cylinder exerting on it a pressure, for a compression of less than 0.127 mm as recommended by the supplier, of around 10 kg/cm². If the contact band between o'ring 9 and cylinder 7 has a 0.2 mm width, for a cylinder which diameter is 200 mm, the corresponding circumference length is 628.3 mm and the contact area equals said value 0.2 mm times, which equals 125.66 mm² or 1.26 cm². Taking into account the fact that the maximum friction coefficient for this situation, that is experienced when the piston starts moving relative to the cylinder, is approximately 0.05, then the force necessary to overcome this resistance is, approximately:

$$10 \text{ kg/cm}^2 \times 1.26 \text{ cm}^2 \times 0.05 = 0.628 \text{ kg}$$

This force is very small in comparison with the force generated by the cylinder-piston set which for a Ø 200 mm cylinder equals approximately 314.16 kg (2/1000). When the vehicle is moving, the friction enters the mixed- and hydrodynamic phases, with even much smaller values.

Although a particular type of o'ring has been employed to describe this embodiment, there is a wide range of technical possibilities to be adopted as a function of type of application envisaged, such as U-seals, PTFE seals. In particular, within the reach of the present invention must be considered the application of the aerostatic suspension system to equipments which require mechanical isolation from all vibrations coming from the ground or from any other source, such as it is the case for electron microscope slide mountings, measuring instruments, etc. In such cases, the sealing element of choice may include other technologies such as ferrofluidic seals, by themselves or in combination with standard seals.

Figure 7:
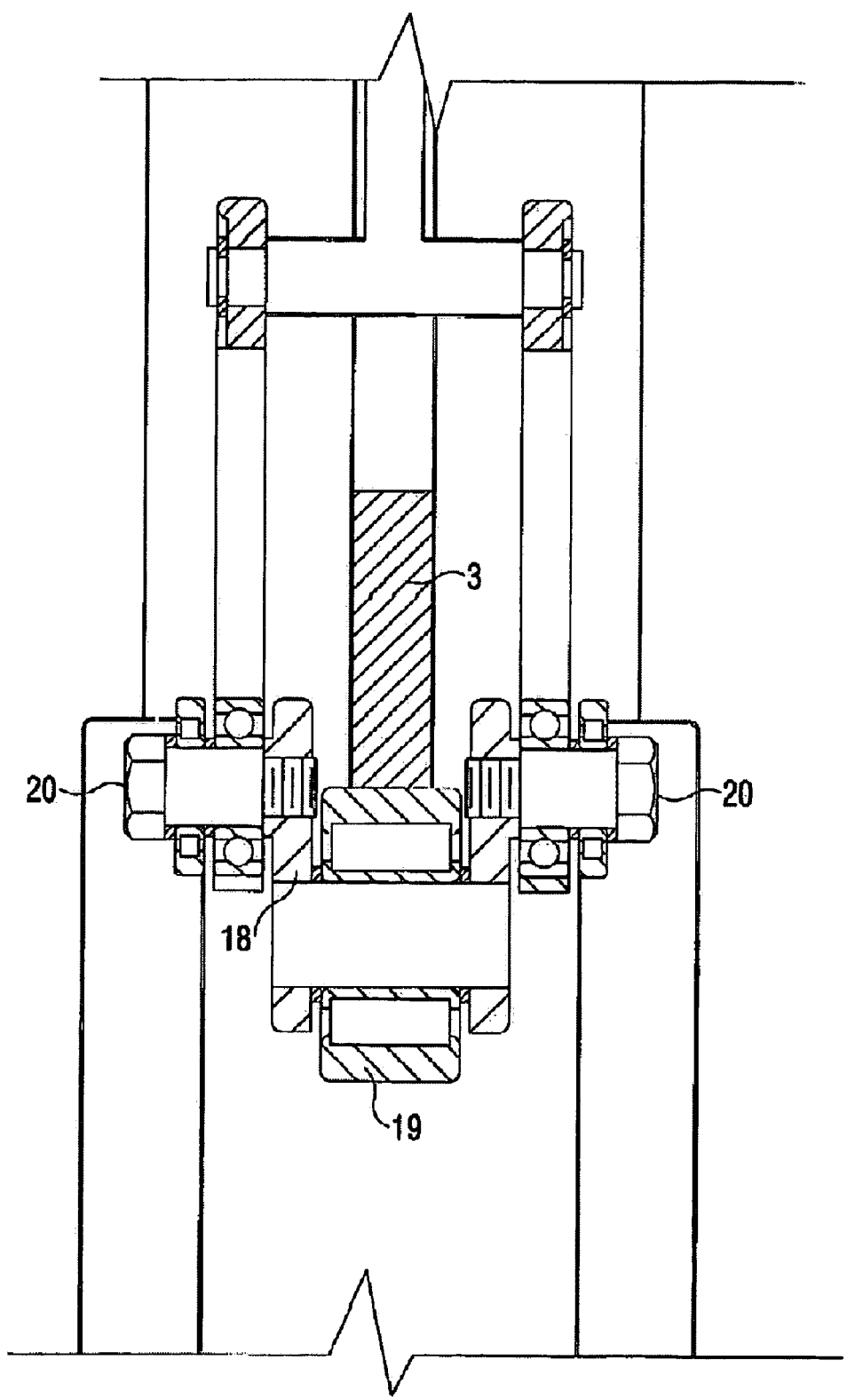
FIG. 7 shows section on A-A, as indicated in FIG. 3.

Piston 8 is connected to the structure by means of a stem—cardanic joint 16 set shown in FIG. 4. This cardanic joint prevents that minor misalignments could turn into forces that might break the lubricant layer that protects the cylinder and piston, leading to dry friction which could result in damage to either or both. FIG. 4 shows the mechanism that transmits the force exerted by the atmosphere on the lower end of the cylinder from stem 17 to lever 3. This mechanism, because of its design characteristics, ensures the invariability of the point of application of force between roller and lever relative to vertical axis of displacement. Said mechanism, shown in detail in FIG. 7, comprises a metallic frame 18 within which roller 19 is housed. As the working position of lever 3 changes its angle, rocking holder 18 together with roller 19 pivot keeping invariable the point of application of force relative to the vertical axis, since the axis of rotation of holder, which is determined by mounting rollers 20, is co-linear with the contact line of roller 19.

Figure 5:
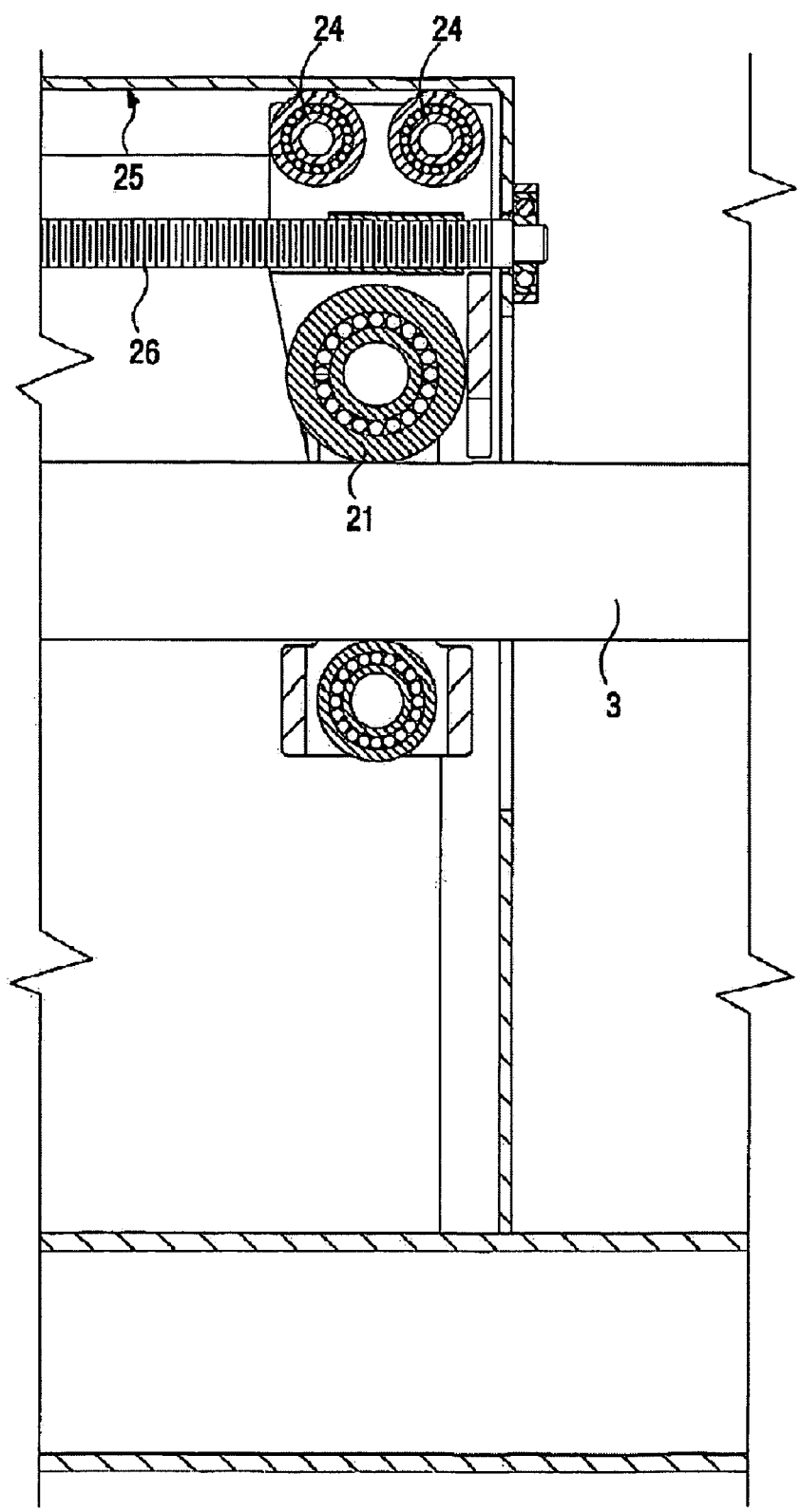
FIG. 5 shows section on B-B, as indicated in FIG. 2.
Figure 8:
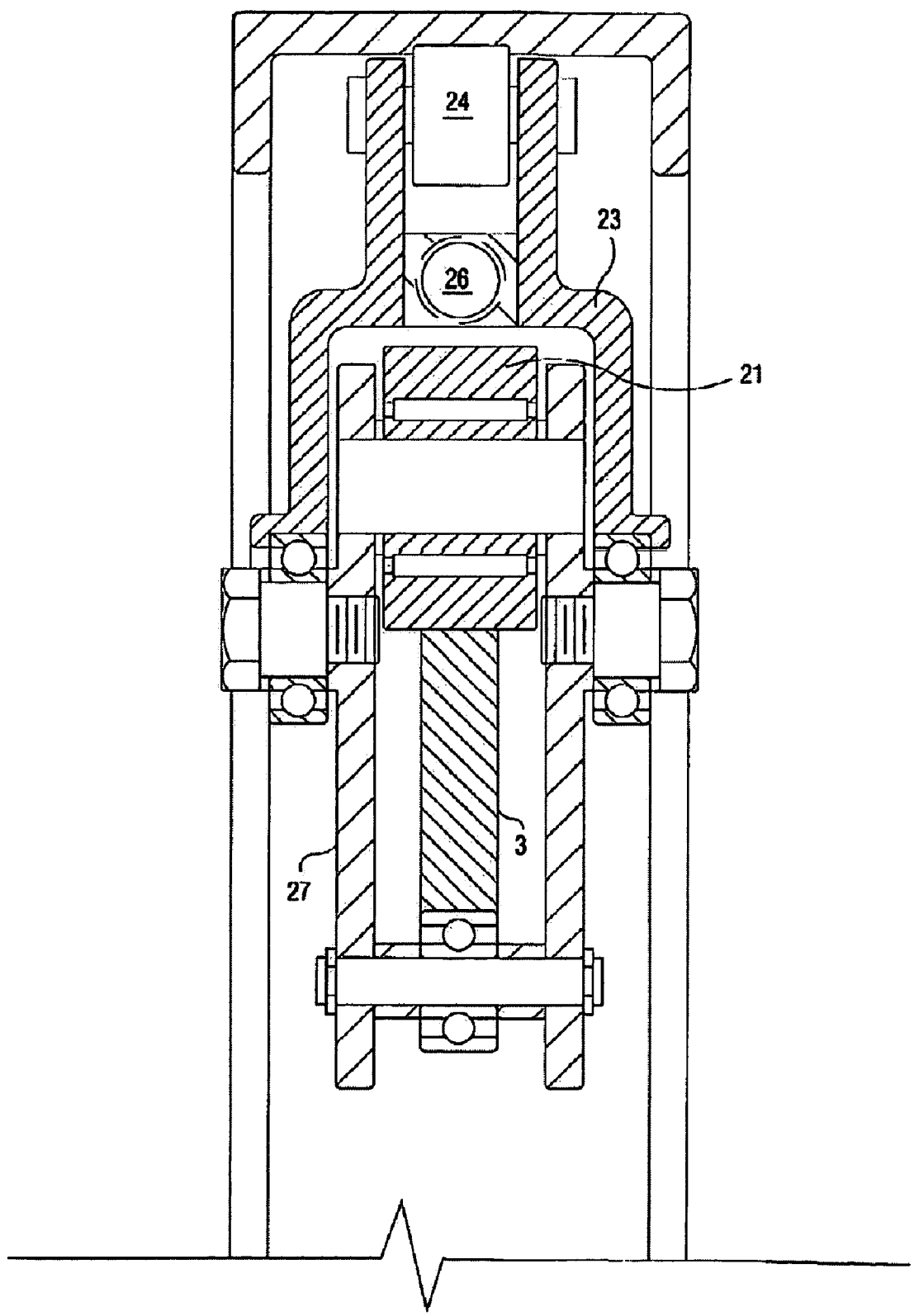
FIG. 8 shows section on B-B, as indicated in FIG. 3.

The adjustable point of application of transmitted force 6, shown in FIG. 5 which is a section on B-B as indicated in FIG. 2, can also be seen in FIG. 8, which is a section on B-B as indicated in FIG. 3. It comprises a metal frame 23 with rollers 24 that are displaceable along track 25. This said frame also includes position adjustment threaded spindle 26.

In the lower end of said frame, there is a rocker arm 27 which carries the support roller 21.

The point of contact between lever 3 and roller 21 is co-linear with the axis of rotation of the mounting bearings of the supporting element of roller 21 so as to ensure its invariability, regardless the angle of application of force. These design characteristics make sure the ratio between lever arms 3-A and 3-B does not change as the leverage angle changes. Thus, as lever 3 angle changes, its effective length increase does not have as a consequence a change in lever arm ratio, since both arms are incremented in the same proportion. The phrase "Lever arms" must be construed as the distances between the point of contact of roller 19 and that of roller 21(3-A), and that existing between the point of contact of said roller 21 and the axis of joint 22 between lever 3 and wheel support rod 4 (3-B).

The threaded spindle 26, shown in FIG. 5, allows by turning it, the adjustment of point of application of force so as to adapt the carrying capacity of the system to the weight of equipment or vehicle plus load. The left end of threaded spindle 26 is mounted on roller 28, which can handle radial and axial loads, since when the angular position of lever 3 changes from horizontal, an axial load is generated. This roller is shown in detail 28 in FIG. 4.

Figure 6:
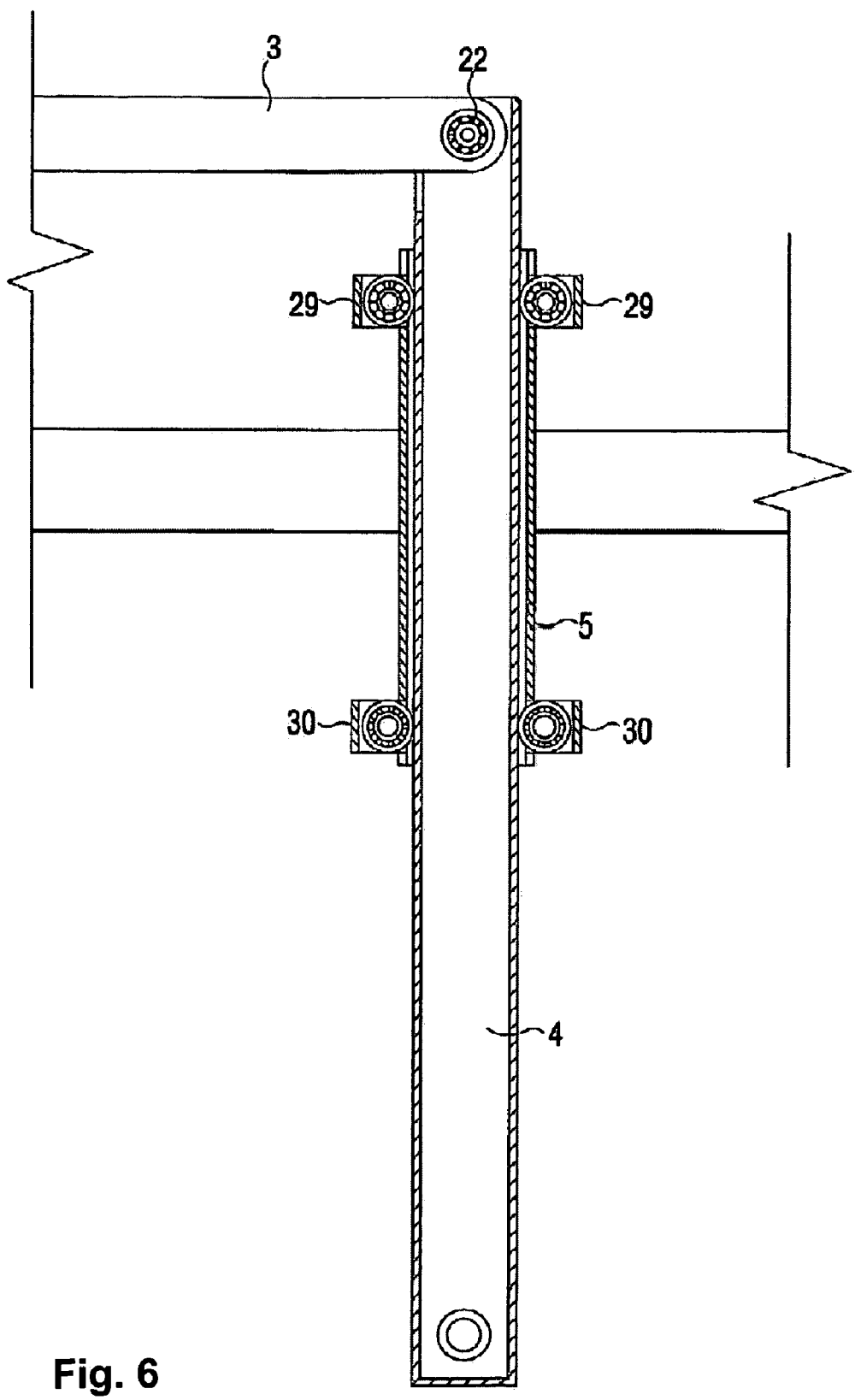
FIG. 6 shows section on C-C, as indicated in FIG. 2.

The opposite end of lever 3, as shown in FIG. 3, is connected to the wheel support rod 4. FIG. 6, which is a section on C-C as indicated in FIG. 2, shows the linkage mechanism of these two elements. The telescopic wheel mounting allows the wheel support rod to slide up and down along the vertical axis, parallel to axis of displacement of cylinder 7. This is necessary in order to keep a constant lever arm ratio, as it has been shown above.

The position of roller bearing 21 point of application can be adjusted manually or by means of electronic control devices. Once this position has been correctly adjusted so as to achieve an equilibrium between carrying capacity and the weight of the vehicle plus load, said vehicle will be ready for horizontal travel.

Figure 9:
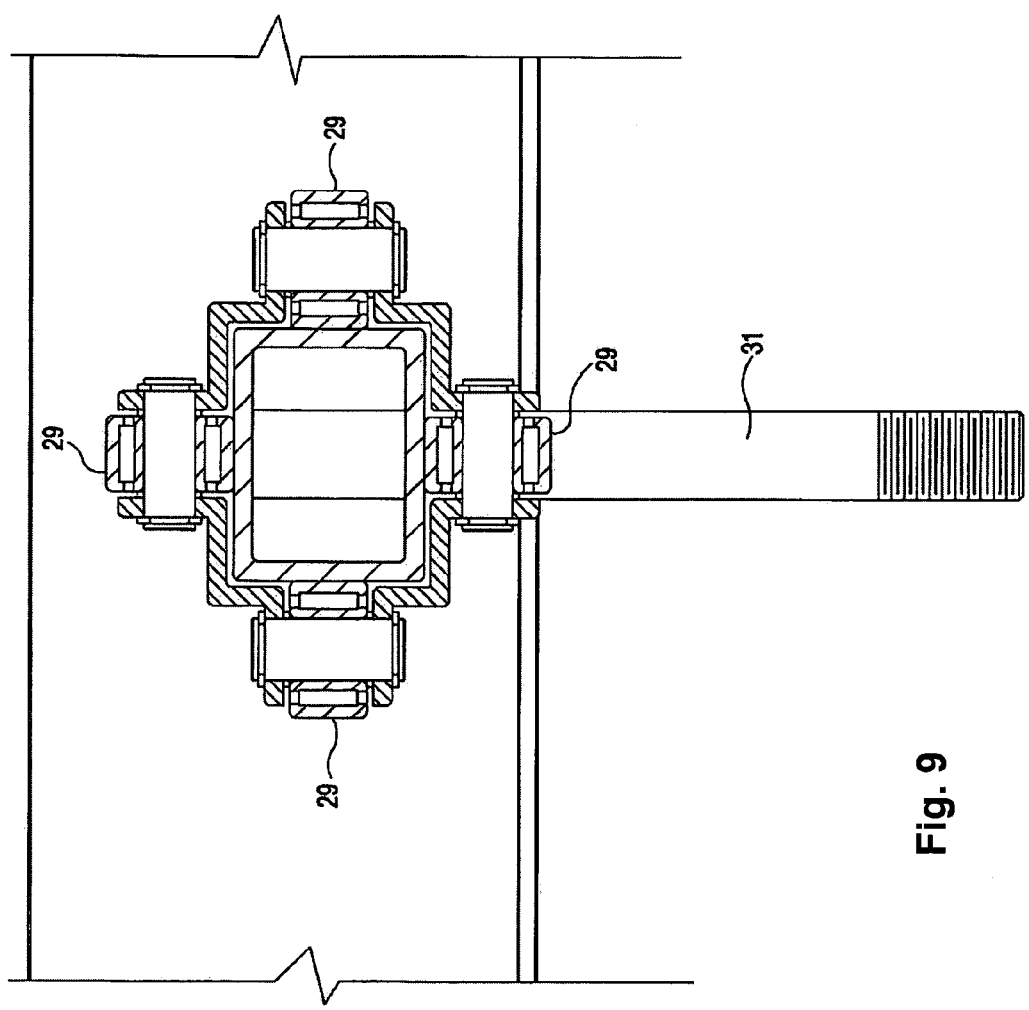
FIG. 9 shows section on C-C, as indicated in FIG. 3.

Wheel support rods can be constructed with rectangular section extrusions, such as shown in FIG. 9, which is a section on C-C as indicated in FIG. 3. Wheel support rod 4 slides on two sets of rollers 29 and 30 mounted on a rectangular cage 5. FIG. 9 shows a section on C-C as indicated in FIG. 3 of embodiment and mounting of said rollers 29. The wheel support rod has in its lower end the axle on which wheel 31 is mounted.

System Operation

The system described here works as follows:

The section area for each piston, expressed in square centimetres, times atmospheric pressure expressed in kg/cm² represents the maximum suspension capacity for each wheel, for a 1:1 lever arm ratio. If the cylinder radius is 10 cm, for a 1:1 lever arm ratio, the maximum suspension capacity, $Sc_{(max)}$, will be:

$$Sc(max)=3.1416 \times (10 \text{ cm})^2 \times 1 \text{ kg/cm}^2 \times 4 \text{ (wheels)}$$
$$=1256.64 \text{ kg}$$

Minimal suspension capacity, $Sc_{(min)}$, will be achieved for a 1:2 lever arm ratio (that is, with point of application of force at ⅓ of total effective length of lever as measured from the cylinder side). $Sc_{(min)}$ is given by:

$$Sc_{(min)}=3.1416 \times (10 \text{ cm})^2 \times 1 \text{ kg/cm}^2 \times \tfrac{1}{2} \times 4 \text{ (wheels)}$$
$$=628.32 \text{ kg}$$

The difference between $Sc_{(max)}$ and $Sc_{(min)}$ is in this situation 628.32 kg. This means that the vehicle can accept a net load of between zero and 628.32 kg, by simply adjusting the position of point of application of force. Chosen values for lever arm ratio are only meant to show how the system could be implemented in standard vehicles. At this point, it becomes clear that, as the bodywork of vehicle is not subjected to the forces generated in standard suspension systems, lighter bodyworks can be built that will significantly improve the load/weight ratio of the vehicle. Maintaining the piston diameter used in the previous example and working with smaller loads and weights, it becomes possible to reduce the lever arm ratio to, for example, 1:2 for maximum load (which would be then 628.32 kg ) and 1:4 for minimal load (which would then be 314.16 kg). These variations intend to show the system's adaptability to the different conditions that may be encountered in the design of said vehicles.

These examples have shown how the system can be adjusted to variable load conditions. It has been shown that this adaptation is achieved by changing the point of application of force on the lever. Once the vehicle is correctly adjusted to its load, it is ready to run.

Although the invention has been described and its use exemplified for a particular embodiment, such as a rolling vehicle, it must be understood that the aerostatic suspension system can be used on equipments which may need mechanical isolation from any vibration coming from the ground or any other source, such as might be the case for electron microscope slide mountings or measuring instruments.

The invention claimed is:

1. An aerostatic suspension system for rolling equipment and vehicles comprising a cylinder-piston set,
    wherein the piston (8) is linked to a suspended structure of the equipment or the vehicle by means of a cardanic joint that allows pivoting in two co-planar horizontal axes,
    wherein the cylinder (7), possessing one degree of freedom along a vertical axis, is connected to a lever (3) with an adjustable point of application of force mechanism (6),
    wherein a distal end of said lever is articulated with a higher end of a wheel support rod of vehicle or equipment support,
    wherein said piston is provided with seals, and
    wherein at least one of the seals comprises a ferrofluidic seal, by itself or in combination with elastomeric O-ring seals.

2. An aerostatic suspension system for rolling equipment and vehicles comprising a cylinder-piston set,
    wherein the piston (8) is linked to a suspended structure of the equipment or the vehicle by means of a cardanic joint that allows pivoting in two co-planar horizontal axes,
    wherein the cylinder (7), possessing one degree of freedom along a vertical axis, is connected to a lever (3) with an adjustable point of application of force mechanism (6), wherein a distal end of said lever is articulated with a higher end of a wheel support rod of vehicle or equipment support, and wherein said adjustable point of application of force mechanism (6) comprises a frame (23) with rollers (24) which allow displacement of said frame along a track (25), wherein said frame (23) also holds a position-adjustment threaded spindle (26), wherein on the lower end of said frame is mounted a support roller (21), wherein the point of application of force between lever (3) and roller (21) is co-linear with the turning axis of the mounting rollers for supporting rocker arm of roller (21) so as to ensure its invariability irrespective of angular change of application of force, thus ensuring that lever arm ratio (3-A and 3-B) does not change as a leverage angle changes, and as lever (3) inclination changes, the total effective length increase does not represent a change in the lever arm ratio, given that both increase in the same proportion.

3. An aerostatic suspension system for rolling equipment and vehicles comprising a cylinder-piston set, wherein the piston (8) is linked to a suspended structure of the equipment or the vehicle by means of an articulation that allows pivoting in two co-planar horizontal axes, wherein the cylinder (7), possessing one degree of freedom along a vertical axis, is connected to a lever (3) with an adjustable point of application of force mechanism (6), wherein a distal end of said lever is articulated with a higher end of a wheel support rod of vehicle or equipment support, wherein said piston is provided with seals, and wherein at least one of the seals comprises a ferrofluidic seal, by itself or in combination with elastomeric O-ring seals.

4. An aerostatic suspension system according to claim 3, wherein the piston and the cylinder are constructed out of the same material.

5. An aerostatic suspension system according to claim 3, wherein the articulation is an articulated joint.

6. An aerostatic suspension system according to claim 3, wherein said adjustable point of application of force mechanism (6) comprises a frame (23) with rollers (24) which allow displacement of said frame along a track (25), wherein said frame (23) also holds a position-adjustment threaded spindle (26), wherein on the lower end of said frame is mounted a support roller (21), wherein the point of application of force between lever (3) and roller (21) is co-linear with the turning axis of the mounting rollers for supporting rocker arm of roller (21) so as to ensure its invariability irrespective of angular change of application of force, thus ensuring that lever arm ratio (3-A and 3-B) does not change as a leverage angle changes, and as lever (3) inclination changes, the total effective length increase does not represent a change in the lever arm ratio, given that both increase in the same proportion.

7. An aerostatic suspension system for rolling equipment and vehicles comprising a cylinder-piston set, wherein the piston (8) is linked to a suspended structure of the equipment or the vehicle by means of an articulation that allows pivoting in two co-planar horizontal axes, wherein the cylinder (7), possessing one degree of freedom along a vertical axis, is connected to a lever (3) with an adjustable point of application of force mechanism (6), wherein a distal end of said lever is articulated with a higher end of a wheel support rod of vehicle or equipment support, and wherein said adjustable point of application of force mechanism (6) comprises a frame (23) with rollers (24) which allow displacement of said frame along a track (25), wherein said frame (23) also holds a position-adjustment threaded spindle (26), wherein on the lower end of said frame is mounted a support roller (21), wherein the point of application of force between lever (3) and roller (21) is co-linear with the turning axis of the mounting rollers for supporting rocker arm of roller (21) so as to ensure its invariability irrespective of angular change of application of force, thus ensuring that lever arm ratio (3-A and 3-B) does not change as a leverage angle changes, and as lever (3) inclination changes, the total effective length increase does not represent a change in the lever arm ratio, given that both increase in the same proportion.

8. An aerostatic suspension system according to claim 7, wherein the piston and the cylinder are constructed out of the same material.

9. An aerostatic suspension system according to claim 7, wherein said piston is provided with seals.

10. An aerostatic suspension system according to claim 9, wherein at least one of the seals is an elastomeric O-ring.

11. An aerostatic suspension system according to claim 7, wherein the articulation is an articulated joint.

* * * * *